United States Patent [19]

Maruta et al.

[11] 4,424,245

[45] Jan. 3, 1984

[54] THERMOSENSITIVE-RECORDING-TYPE LABEL SHEET

[75] Inventors: Keiichi Maruta; Yukihiro Yuyama, both of Numazu, Japan

[73] Assignee: Ricoh Company, Ltd., Tokyo, Japan

[21] Appl. No.: 352,608

[22] Filed: Feb. 24, 1982

[30] Foreign Application Priority Data

Mar. 5, 1981 [JP] Japan .................................. 56-31458

[51] Int. Cl.$^3$ .............................................. B41M 5/18
[52] U.S. Cl. ....................................... 428/40; 40/2 R; 282/27.5; 428/336; 428/339; 428/354; 428/488; 428/514; 428/913; 428/914
[58] Field of Search ................................ 427/150–153; 428/488, 537, 913, 40, 195, 200, 202–204, 206, 207, 211, 320.4, 320.6, 320.8, 336, 339, 343, 346–349, 352, 354, 474.4, 478.2, 478.8, 479.6, 484, 514, 530; 282/27.5; 40/2 R; 106/21, 31

[56] References Cited

U.S. PATENT DOCUMENTS

4,370,370  1/1983  Iwata et al. ........................ 282/27.5

*Primary Examiner*—Bruce H. Hess
*Attorney, Agent, or Firm*—Flynn, Thiel, Boutell & Tanis

[57] ABSTRACT

A thermosensitive-recording-type label sheet comprising a support material; a thermosensitive coloring layer formed on the front side of the support material, the thermosensitive coloring layer comprising a leuco dye and an acidic material capable of coloring the leuco dye when heat is applied thereto; and a barrier layer formed on the back side of said support material, opposite to the thermosensitive coloring layer, the barrier layer comprising a water-soluble polymeric material and a water-repellent wax or wax-like material and capable of preventing intrusion into the thermosensitive coloring layer of materials which may discolor the thermosensitive coloring layer; and an adhesive layer formed on said barrier layer. In this label sheet, the wax or wax-like material contained in the barrier layer plays an important role of protecting the thermosensitive coloring layer during the production of the label sheet as well as while in use.

10 Claims, No Drawings

THERMOSENSITIVE-RECORDING-TYPE LABEL SHEET

BACKGROUND OF THE INVENTION

The present invention relates to an improved thermosensitive-recording-type label sheet.

Conventionally, there are known thermosensitive recording sheets comprising a support material and a thermosensitive coloring layer formed thereon, which coloring layer contains a leuco dye and an acidic material capable of coloring the leuco dye upon application of heat. The thermosensitive recording sheets of this type are used as labels applied to wrapped products, produce, etc. Those thermosensitive-recording-type labels have an advantage over conventional labels on which printing is done using ink or ink ribbon, in that clear images can be printed easily and neatly by use of a thermal head.

However, the conventional thermosensitive recording sheets have the shortcoming that when their thermosensitive coloring layer is kept in contact with a plastic film, the images and letters formed on the thermosensitive recording sheets lose their color and become illegible due to the intrusion into the thermosensitive coloring layer of plasticizers, such as dioctyl phthalate and dioctyl adipate, contained in the plastic film. Therefore, those conventional thermosensitive recording sheets cannot be used as labels applied to plastic wrapping films.

Recently it has become quite common in supermarkets and other stores for perishable foods, such as fish, vegetables and meat, to be packed in plastic trays made of, for instance, foam polystyrene, and entirely wrapped with plastic films, with attachment of labels indicating prices and/or contents. If the conventional thermosensitive recording sheets are employed as such labels and applied to the wrapping films, plasticizers contained in the wrapping films will gradually penetrate the adhesive layer and support material of the thermosensitive recording sheets and enter the thermosensitive coloring layer, and the printed images on the labels will lose their color and become illegible in a certain period of time.

That the printed images and letters cannot be made permanent and will be lost with time is an obvious disadvantage and causes various problems in sales activities. This shortcoming has been a significant hindrance to employment of the conventional thermosensitive recording sheets in practice as the labels for the above-described application, although it is well appreciated that thermal printing provides clearer images and can be done more easily than the conventional printing system employing ink or ink ribbons.

SUMMARY OF THE INVENTION

It is therefore an object of the present invention to provide a thermosensitive-recording-type label sheet capable of forming images or letters thereon by a thermal printing apparatus and also capable of retaining images formed thereon even if it is continuously in contact with films which contain plasticizers, which thermosensitive recording material comprises (1) a support material, (2) a thermosensitive coloring layer formed thereon, comprising a leuco dye and an acidic material, (3) a barrier layer formed on the back side of the support material, opposite to the thermosensitive coloring layer, which barrier layer comprises a water-soluble polymeric material and a wax or wax-like material, and is capable of preventing intrusion of materials which may discolor the thermosensitive coloring layer, and (4) an adhesive layer formed on the barrier layer, by which adhesive layer the thermosensitive-recording-type label sheet can be applied to the surface of any solid material. A key feature of the present invention is that a wax or wax-like material is employed in the barrier layer between the support material and the adhesive layer.

For the sake of convenience in use, a disposable backing sheet can be attached to the adhesive layer, which backing can be peeled off the adhesive layer when the label sheet is used. Further, a protective layer can be formed on the thermosensitive coloring layer in order to protect the thermosensitive coloring layer from plasticizers which may come into contact with it.

DETAILED DESCRIPTION OF THE PREFERRED EMBODIMENTS

A thermosensitive-recording-type label sheet according to the present invention comprises (1) a support material, (2) a thermosensitive coloring layer comprising a leuco dye and an acidic material, formed on the support material, and (3) a barrier layer formed on the back side of the support material, opposite to the thermosensitive coloring layer, which barrier layer comprises a water-soluble polymeric material and a wax or wax-like material and prevents intrusion into the thermosensitive coloring layer of materials which may discolor the thermosensitive coloring layer, and (4) an adhesive layer formed on the barrier layer.

For the sake of convenience in use, a disposable backing sheet can be attached to the adhesive layer, which can be peeled off the adhesive layer when the label sheet is used. Further, a protective layer can be formed on the thermosensitive coloring layer in order to protect the thermosensitive coloring layer from plasticizers which may come into contact with it.

As mentioned above, the barrier layer in the present invention serves to prevent plasticizers which may discolor the thermosensitive coloring layer from entering the same through the adhesive layer and the support material, even if the label sheet according to the present invention is applied to a plastic film containing such plasticizers.

When a thermosensitive-recording-type label sheet according to the present invention is prepared, a water-soluble, polymeric, layer-forming liquid containing a wax or wax-like material is first coated on the back side of the support material and is dried to form the barrier layer, followed by coating a thermosensitive-coloring-layer-forming liquid on the front side of the support material to form a thermosensitive coloring layer. If these steps are reversed, there is the risk that the thermosensitive coloring layer will be colored when the barrier layer is dried.

The wax or wax-like material contained in the barrier layer serves to stabilize the surface of the barrier layer, which barrier layer comprises a water-soluble polymeric material. When the thermosensitive-coloring-layer-forming liquid is coated on the front side of the support material, if such a wax or wax-like material is not contained in the barrier layer, water present in the liquid penetrates the barrier layer through the support material, and plasticization by the water of the film-like barrier layer occurs. Once this happens, the surface of the barrier layer becomes vulnerable and easily loses its smoothness when it is brought into contact with rollers for drying the thermosensitive coloring layer. Such a barrier layer will not thereafter work as a barrier against plasticizers.

The thickness of the barrier layer is in the range of 0.3 μm to 20 μm, preferably in the range of 1 μm to 5 μm.

For use in the barrier layer, the following water-soluble polymeric materials can be used:

Polyvinyl alcohol, hydroxyethyl cellulose, methyl cellulose, carboxymethyl cellulose, starch and derivatives thereof, casein, sodium alginate, polyvinyl pyrrolidone, polyacrylamide, and a copolymer of styrene and maleic acid.

In the barrier layer, the following water-repellent wax or wax-like materials with a melting point ranging from 50° C. to 250° C. can be employed:

Vegetable waxes such as carnauba wax, candelilla wax, ouricury wax, rice wax and haze wax; animal waxes such as beeswax, shellac wax, wool wax and whale wax; mineral waxes such as montan wax, ozokerite, ceresine wax; petroleum waxes such as paraffin wax and microcrystalline wax; synthetic waxes such as polyethylene wax, polypropylene wax and polystyrene wax; straight-chain saturated fatty acids such as tetradecanoic acid, pentadecanoic acid, hexadecanoic acid, heptadecanoic acid, octadecanoic acid, nonadecanoic acid, eicosanoic acid, heneicosanic acid, docosanoic acid, tricosanoic acid, tetracosanoic acid, pentacosanoic acid, hexacosanoic acid, heptacosanoic acid, octacosanoic acid, nonacosanoic acid, triacontanoic acid, hentriacontanoic acid, dotriacontanoic acid, tetratriacontanoic acid, hexatriacontanoic acid and octatriacontanoic acid; branched-chain saturated fatty acids such as 16-methylheptadecanoic acid, 3-methyl-2-octylynonanoic acid, 2,3-dimethyloctadecanoic acid, 2-methyltetracosanoic acid, 11-methyltetracosanoic acid, 2-pentadecyl-heptadecanoic acid; unsaturated fatty acids such as trans-3-octadecenic acid, trans-11-eicosenic acid, 2-methyl-2-eicosenic acid, 2-methyl-2-hexacosenic acid, β-eleostearic acid, α-parinaric acid, 5-stearolic acid, 9-nonadecenoic acid, behenoic acid and 22-tricosenic acid; cyclic acids such as cis-9, 10-methyleneoctadecanoic acid and hydnocarpic acid; derivatives of the above-mentioned fatty acids, e.g. (i) amide derivatives, such as stearamide, N-methyamides, anilides, β-naphthylamides, N-(2-hydroxyethyl) amides, N-(mercaptoethyl) amides, N-octadecylamide, phenylhydrazides and hydroxamic acids, (ii) ester derivatives, such as methyl esters and ethyl esters, (iii) mono-, di-, triglyceride derivatives and (iv) anhydrides.

In the present invention, the amount of such wax or wax-like material added to the water-soluble polymeric material in the barrier layer is in the range of 0.05 wt.% to 5 wt.%, preferably in the range of 0.1 wt.% to 2 wt.%, with respect to the total weight of the barrier layer. When the amount of such wax or wax-like material is less than the above-mentioned amount, the wax or wax-like material cannot attain the desired effect, while when the amount exceeds the above-mentioned maximum, formation of the water-soluble polymeric material into a film in the barrier layer becomes difficult.

A thermosensitive-recording-type label sheet according to the present invention can be produced by the following procedure:

A water-soluble polymeric material liquid containing one of the aforementioned wax or wax-like materials is coated on the back side of a sheet-form support material, such as a sheet of ordinary paper or synthetic paper, and is then dried, so that a barrier layer is formed.

A thermosensitive-coloring-layer-forming liquid comprising a leuco dye, an acidic material and a binder agent, and, if necessary, with addition of a thermosensitivity-increasing agent, a filler and other additives, is coated on the front side of the support material, opposite to the barrier layer, and is then dried.

An adhesive layer is then formed on the barrier layer by the conventional procedure, so that the label sheet can be applied to the surface of any solid material including wrapping films and wrap paper.

For the convenience of use of the label sheet, a disposable backing sheet is attached to the adhesive layer, and when the label sheet is used, the disposable backing sheet is peeled off the adhesive layer.

Further, a protective layer can be formed on the thermosensitive coloring layer in order to protect the thermosensitive coloring layer from materials which may discolor the coloring layer, such as plasticizers, when the label sheet is covered with a plastic film or wrapping film containing such plasticizers. This protective layer can be prepared in the same manner as in the case of the aforementioned barrier layer formed between the support material and the adhesive layer.

As mentioned above, the thermosensitive coloring layer in the present invention comprises a leuco dye, an acidic material, a binder agent and other materials. Specific examples of these components for the formation of the thermosensitive coloring layer are as follows:

(1) Leuco Dyes

In the present invention, colorless or light-colored leuco dyes are usually employed. In particular, the following triphenylmethane leuco dyes, fluoran leuco dyes, phenothiazine leuco dyes, Auramine leuco dyes and spiropyran leuco dyes are preferable for use in the present invention:

3,3-bis(p-dimethylaminophenyl)-6-dimethylaminophthalide;

3,3-bis(p-dimethylaminophenyl) phthalide;

3,3-bis(p-dimethylaminophenyl)-6-diethylaminophthalide;

3,3-bis(p-dimethylaminophenyl)-6-chlorophthalide;

3-(N-p-tolyl-N-ethylamino)-6-methyl-7-(N-phenylamino)fluoran;

3-diethylamino-7-chlorofluoran benzoyl leuco methylene blue;

6'-chloro-8'-methoxy-benzoindolino-pyrylospyran;

6'-bromo-8'-methoxy-benzoindolino-pyrylospyran; and

2-[3,6-bis(diethylamino)-9-(o-chloroanilino) xanthyl] benzoic acid lactam.

(2) Acidic Materials

The following acidic materials, which react with the above-described leuco dyes by application of heat and color those leuco dyes, are employed:

a. Organic and Inorganic Acids: Boric acid, oxalic acid, maleic acid, tartaric acid, citric acid, succinic acid, benzoic acid, stearic acid, gallic acid, salicylic acid, 1-hydroxy-2-naphthoic acid, o-hydroxy-benzoic acid, m-hydroxybenzoic acid, and 2-hydroxy-p-toluic acid.

b. Phenolic Materials: 3,5-xylenol, thymol, p-tert-butylphenol, 4-hydroxyphenoxide, methyl-4-hydroxybenzoate, 4-hydroxyacetophenone, α-naphthol, β-naphthol, catechol, resorcin, hydroquinone, 4-tert-octylcatecol, 2,2'-dihydroxydiphenol, 2,2'-methylene-bis(4-methyl-6-tert-butylphenol), 2,2-bis(4-hydroxyphenyl) propane (or bisphenol A), 4,4-isopropylidene-bis(2-tertbutylphenol), 4,4-sec-butylidene-diphenol, pyrogallol, phloroglucine and phloro-glucino-carboxylic acid.

(3) Binder Agents

Binder agents for use in the present invention serve to bind the thermosensitive coloring layer to the support material. Examples of such binder agents are as follows:

Water-soluble organic polymers, such as polyvinyl alcohol, methoxy cellulose, hydroxyethyl cellulose, carboxymethyl cellulose, polyvinyl pyrrolidone, polyacrylamide, polyacrylic acid, starch and gelatin; and aqueous emulsions of polystyrene, a copolymer of vinyl chloride and vinyl acetate, and polybutylmethacrylate.

In the thermosensitive coloring layer, the following additives can be contained in the form of fine powder, which are useful in obtaining clear images:

Calcium carbonate, silica, alumina, magnesia, talc, titania, barium sulfate and aluminum stearate.

Further, to the thermosensitive coloring layer, a thermosensitivity-increasing agent, for instance, higher fatty acid amides, can be added.

Embodiments of a thermosensitive-recording-type label sheet according to the present invention will now be described in detail.

EXAMPLE 1

A dispersion A, a dispersion B and a dispersion C were prepared separately by dispersing the following components of each dispersion in a ball mill for 24 hours.

|  | (Parts by Weight) |
|---|---|
| Dispersion A | |
| 3-diethylamino-6-methyl-7-anilinofluoran | 1.5 |
| Calcium carbonate | 1.0 |
| 20% aqueous solution of oxidized starch | 5.0 |
| Water | 42.5 |
| Dispersion B | |
| Bisphenol A | 6.0 |
| 20% aqueous solution of oxidized starch | 8.0 |
| Water | 36.0 |
| Dispersant C | |
| 5% aqueous solution of polyvinyl alcohol | 100.0 |
| Polyethylene wax | 0.05 |

The dispersion C was coated uniformally by a coater on the back side of a sheet of high quality paper (basis weight: 157 g/m²) so as to form a barrier layer with a deposition of 1 g/m² of solid components thereof when the coated barrier layer was dried.

The dispersion A and dispersion B were mixed together well to prepare a thermosensitive coloring liquid for forming a thermosensitive coloring layer. The thermosensitive coloring liquid was coated uniformly on the opposite side to the barrier layer of the above-mentioned paoer so as to form a thermosensitive coloring layer with a deposition of 8 g/m² of solid components thereof when the thermosensitive coloring layer was dried, whereby a thermosensitive-recording-type label sheet No. 1 according to the present invention was prepared.

EXAMPLE 2

Example 1 was repeated except that the dispersion C was replaced by a dispersion D which was prepared by mixing the following components, whereby a thermosensitive-recording-type label sheet No. 2 according to the present invention was prepared:

| Dispersion D | (Parts by Weight) |
|---|---|
| 5% aqueous solution of polyvinyl alcohol | 100.0 |
| Stearamide | 0.005 |

Comparative Example 1

Example 1 was repeated except that the dispersion C was replaced by a 5% aqueous solution of polyvinyl alcohol, so that a comparative thermosensitive-recording-type label sheet was prepared.

Thermal printing was performed on the thus prepared thermosensitive-recording-type labels by use of a heat gradient test apparatus (made by Toyo Seiki Co., Ltd.) at 150° C. with a pressure of 2 kg/cm² applied to each label for 1 second. The printed portions of each label were covered with a polyvinylchloride wrapping film (Trade Name: Polymerwrapy U-300 made by Shin-etsu Polymer Company, Ltd.). Each label was allowed to stand at 20° C. with a pressure of 100 g/cm² applied thereto for 24 hours.

Changes in image density of the printed images in each label were measured by a Macbeth densitometer.

The results of that measurements are shown in Table 1.

TABLE 1

|  | Initial Image Density | Image Density After 24 Hours | Image Quality |
|---|---|---|---|
| No. 1 | 1.36 | 1.36 | Good |
| No. 2 | 1.36 | 1.36 | Good |
| Comp. 1 | 1.36 | 1.12 | Non-uniform |

(Note)
No. 1 and No. 2 are the label sheets according to the present invention, and Comp. 1 is the comparative label.

As can be seen from the above results, the coloring performance of the thermosensitive-recording-type label sheets according to the present invention was not deteriorated by heat application. Moreover, the coating of the water-soluble polymeric material did not have any adverse effects on the thermosensitive coloring layers because of the presence of the wax-like materials in the polymeric material, while, in the comparative label, the adverse effect of the water-soluble polymeric material on the coloring layer was conspicuous.

What is claimed is:

1. A thermosensitive-recording-type label sheet comprising:
   a support material;
   a thermosensitive coloring layer formed on the front side of said support material, said thermosensitive coloring layer comprising a leuco dye and an acidic material capable of coloring said leuco dye when heat is applied thereto;
   a barrier layer formed on the back side of said support material opposite to said thermosensitive coloring layer, said barrier layer having a thickness of from 0.3 to 20 μm, said barrier layer comprising a water-soluble polymeric material and from 0.05 to 5 wt. % of a water-repellent wax or wax-like material based on the total weight of said barrier layer, said barrier layer being capable of preventing intrusion into said thermosensitive coloring layer of materials which may discolor said thermosensitive coloring layer; and an adhesive layer formed on said barrier layer.

2. A thermosensitive-recording-type label sheet as claimed in claim 1, wherein said water-repellent wax or wax-like material contained in said barrier layer is a member or a mixture of members selected from the group consisting of vegetable waxes, animal waxes, mineral waxes, petroleum waxes, synthetic waxes, saturated fatty acids, unsaturated fatty acids, cyclic acids, fatty acid amides, fatty acid esters, fatty acid glycerides and fatty acid anhydrides.

3. A thermosensitive-recording-type label sheet as claimed in claim 1, further comprising a disposable backing sheet which is attached to said adhesive layer and can be peeled off said adhesive layer when said thermosensitive-recording-type label sheet is used.

4. A thermosensitive-recording-type label sheet as claimed in claim 1, further comprising a protective layer formed on said thermosensitive coloring layer, said protective layer comprising a water-soluble polymeric material which is capable of protecting said thermosensitive coloring layer from materials which may discolor said thermosensitive coloring layer.

5. A thermosensitive-recording-type label sheet as claimed in claim 4, wherein said protective layer comprises a water-soluble polymeric material selected from the group consisting of polyvinyl alcohol, hydroxyethyl cellulose, methyl cellulose, carboxymethyl cellulose, starch and derivatives thereof, casein, sodium alginate, polyvinyl pyrrolidone, polyacrylamide, and a copolymer of styrene and maleic acid.

6. A thermosensitive-recording-type label sheet as claimed in claim 1, wherein said leuco dye is a member selected from the group consisting of triphenylmethane leuco dyes, fluoran leuco dyes, phenothiazine leuco dyes, Auramine leuco dyes and spiro-pyran leuco dyes.

7. A thermosensitive-recording-type label sheet as claimed in claim 1, wherein said acidic material is a member selected from the group consisting of organic acids, inorganic acids and phenolic materials other than phenolic acids.

8. A thermosensitive-recording-type label sheet as claimed in claim 1, wherein said thermosensitive coloring layer further comprises a binder agent comprising a water-soluble organic polymer.

9. A thermosensitive-recording-type label sheet as claimed in claim 1, wherein said water-soluble polymeric material contained in said barrier layer is a member selected from the group consisting of polyvinyl alcohol, hydroxyethyl cellulose, methyl cellulose, carboxymethyl cellulose, starch and derivatives thereof, casein, sodium alginate, polyvinyl pyrrolidone, polyacrylamide, and a copolymer of styrene and maleic acid.

10. A thermosensitive recording sheet comprising:

a support sheet;

a thermosensitive coloring layer formed on the front side of said support sheet, said thermosensitive coloring layer comprising a colorless or light-colored leuco dye, an acidic material capable of coloring said leuco dye when heat is applied thereto, and a binder selected from the group consisting of water-soluble organic polymers and organic polymers emulsifiable in water;

a barrier layer formed on the back side of said support sheet opposite to said thermosensitive color layer, said barrier layer having a thickness of from 0.3 to 20 $\mu$m, said barrier layer consisting essentially of a water-soluble polymeric material and from 0.05 to 5 wt.%, based on the total weight of said barrier layer, of a water-repellent wax or wax-like material having a melting point in the range of 50° to 250° C., said barrier layer being capable of preventing intrusion into said thermosensitive coloring layer of materials which may discolor said thermosensitive coloring layer; and an adhesive layer formed on said barrier layer, said thermosensitive recording sheet having been prepared by first applying onto the back side of said support sheet a first coating which is an aqueous solution of said water-soluble polymeric material having said wax or wax-like material dispersed therein and then drying the first coating whereby to form said barrier layer, and then applying onto the front side of said support sheet a second coating which is an aqueous dispersion of said leuco dye, said acidic material and said binder, and then drying the second coating whereby to form said thermosensitive color layer, said wax or wax-like material in said barrier layer being effective to stabilize the surface of said barrier layer and to maintain its smoothness during application and drying of said second coating.

* * * * *